(12) United States Patent
Chin et al.

(10) Patent No.: US 8,516,536 B2
(45) Date of Patent: Aug. 20, 2013

(54) METHOD AND SYSTEM FOR INTERNET CENSORSHIP

(75) Inventors: Frances Mu-Fen Chin, Naperville, IL (US); Jennifer L. Chou, Naperville, IL (US); Daisy Feng-Mei Su, Wheaton, IL (US); ZhongJin Yang, Naperville, IL (US); Yu Yin, Aurora, IL (US)

(73) Assignee: Alcatel Lucent, Paris (FR)

( * ) Notice: Subject to any disclaimer, the term of this patent is extended or adjusted under 35 U.S.C. 154(b) by 1897 days.

(21) Appl. No.: 10/447,057

(22) Filed: May 28, 2003

(65) Prior Publication Data

US 2005/0015453 A1    Jan. 20, 2005

(51) Int. Cl.
*H04N 7/16* (2011.01)

(52) U.S. Cl.
USPC ............................................. 725/142; 725/28

(58) Field of Classification Search
USPC .................... 725/91, 54, 48, 28, 142
See application file for complete search history.

(56) References Cited

U.S. PATENT DOCUMENTS

| | | | | | |
|---|---|---|---|---|---|
| 654,925 | A | * | 7/1900 | Brown | 269/318 |
| 4,930,160 | A | * | 5/1990 | Vogel | 725/30 |
| 5,481,296 | A | * | 1/1996 | Cragun et al. | 725/136 |
| 5,530,703 | A | * | 6/1996 | Liu et al. | 370/255 |
| 5,590,271 | A | * | 12/1996 | Klinker | 715/763 |
| 5,606,668 | A | * | 2/1997 | Shwed | 726/13 |
| 5,608,662 | A | * | 3/1997 | Large et al. | 708/300 |
| 5,617,565 | A | * | 4/1997 | Augenbraun et al. | 707/4 |
| 5,832,212 | A | * | 11/1998 | Cragun et al. | 726/2 |
| 5,950,172 | A | * | 9/1999 | Klingman | 705/26 |
| 6,115,057 | A | * | 9/2000 | Kwoh et al. | 725/28 |
| 6,317,795 | B1 | * | 11/2001 | Malkin et al. | 709/246 |
| 6,321,381 | B1 | * | 11/2001 | Yuen et al. | 725/28 |
| 6,329,984 | B1 | * | 12/2001 | Boss et al. | 715/723 |
| 6,493,744 | B1 | * | 12/2002 | Emens et al. | 709/203 |
| 6,510,458 | B1 | * | 1/2003 | Berstis et al. | 709/219 |
| 6,760,915 | B2 | * | 7/2004 | deCarmo | 725/28 |
| 7,054,547 | B1 | * | 5/2006 | Abecassis | 386/68 |
| 7,139,843 | B1 | * | 11/2006 | Brown et al. | 709/246 |
| 7,200,852 | B1 | * | 4/2007 | Block | 725/28 |
| 7,574,494 | B1 | * | 8/2009 | Mayernick et al. | 709/222 |
| 8,006,279 | B2 | * | 8/2011 | Damm | 725/142 |
| 2002/0016962 | A1 | * | 2/2002 | Decarmo | 725/28 |
| 2002/0091975 | A1 | * | 7/2002 | Redlich et al. | 714/699 |
| 2003/0037329 | A1 | * | 2/2003 | Piotrowski et al. | 725/28 |
| 2004/0143734 | A1 | * | 7/2004 | Buer et al. | 713/153 |

OTHER PUBLICATIONS www.s3.org/PICSarchive.org for year 2002.*

* cited by examiner

*Primary Examiner* — Candice D Wilson
*Assistant Examiner* — Johnathan Lindsey, III
(74) *Attorney, Agent, or Firm* — Fay Sharpe LLP

(57) ABSTRACT

A method of censoring Internet content includes: packetizing a web page into one or more data packets (50); inserting into the data packets censorship ratings corresponding to the web page's content; conveying the data packets (50) over the Internet (30) to a receiving end user terminal (10); determining the censorship ratings of the data packets (50); and, acting on the data packets (50) in response to their determined censorship ratings.

20 Claims, 3 Drawing Sheets

METHOD AND SYSTEM FOR INTERNET CENSORSHIP

FIELD

The present invention relates to the telecommunication arts. It finds particular application in conjunction with the Internet, and will be described with particular reference thereto. However, it is to be appreciated that the present invention is also amenable to other like applications and similar networks.

BACKGROUND

The Internet is a popular communications network accessed by many users, e.g., via an end user terminal (EUT), such as, a general purpose computer, handheld device, etc., to search for and download various types of information supplied by content providers and/or hosts. At times, an end user may desire to censor the content received on their EUT. For example, parents may desire to censor the content that is received on their EUT so as to block or limit their children's access to what the parents may deem objectionable, e.g., pornography, violence, strong or offensive language, etc.

One approach developed to achieve the aforementioned censorship involves the use of a filter that filters out Internet web pages or content based on the words, phrases and/or sentences employ by the web page delivering the content. However, this approach can be by accompanied by undesired effects including censoring content that is otherwise not intended to be blocked. That is to say, key word based filters have certain limitations and cannot always distinguish web pages based on their overall content. For example, acceptable educational material concerning sexual reproduction may be blocked when the desired censorship is meant to block only explicit sexual pictures.

Hence, it is desired to have a method and/or system to discriminate between the different types of content provided by Internet content providers and selectively censor the receipt of web pages by an EUT based upon the identified content being delivered. Accordingly, the present invention contemplates a new and improved method and/or system for Internet censorship that overcomes the above-referenced problems and others.

SUMMARY

In accordance with an aspect of the present invention, a method of censoring Internet content is provided. The method includes: packetizing a web page into one or more data packets; inserting into the data packets censorship ratings corresponding to the web page's content; conveying the data packets over the Internet to a receiving end user terminal; determining the censorship ratings of the data packets; and, acting on the data packets in response to their determined censorship ratings.

In accordance with another aspect of the present invention, a method is provided for censoring content provided by a host over a communications network to an end user terminal. The method includes: formatting the content into data packets; provisioning the data packets with headers; providing for censorship ratings to be contained in the headers, the censorship ratings corresponding to the content contained in the data packets; and, reading the headers to determine the censorship ratings of the data packets such that data packets having censorships ratings that are within defined limits are delivered to the end user terminal and data packets having censorship ratings that are outside the defined limits are not delivered to the end user terminal.

In accordance with yet another aspect of the present invention, a system, for censoring content provided by a host over a communications network to an end user terminal, includes: means for formatting the content into data packets; means for provisioning the data packets with headers; means for storing censorship ratings in the headers, the censorship ratings corresponding to the content contained in the data packets; and, means for reading the headers to determine the censorship ratings of the data packets such that data packets having censorships ratings that are within defined limits are delivered to the end user terminal and data packets having censorship ratings that are outside the defined limits are not delivered to the end user terminal.

Numerous advantages and benefits of the present invention will become apparent to those of ordinary skill in the art upon reading and understanding the present specification.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention. Further, it is to be appreciated that the drawings are not to scale.

DETAILED DESCRIPTION OF PREFEERED EMBODIMENTS

For clarity and simplicity, the present specification shall refer to structural and/or functional network elements, entities and/or facilities, relevant telecommunications standards, protocols and/or services, EUTs and other components that are commonly known in the telecommunications art without further detailed explanation as to their configuration or operation except to the extent the same has been modified or altered in accordance with and/or to accommodate aspects of the present invention.

Figure 1:
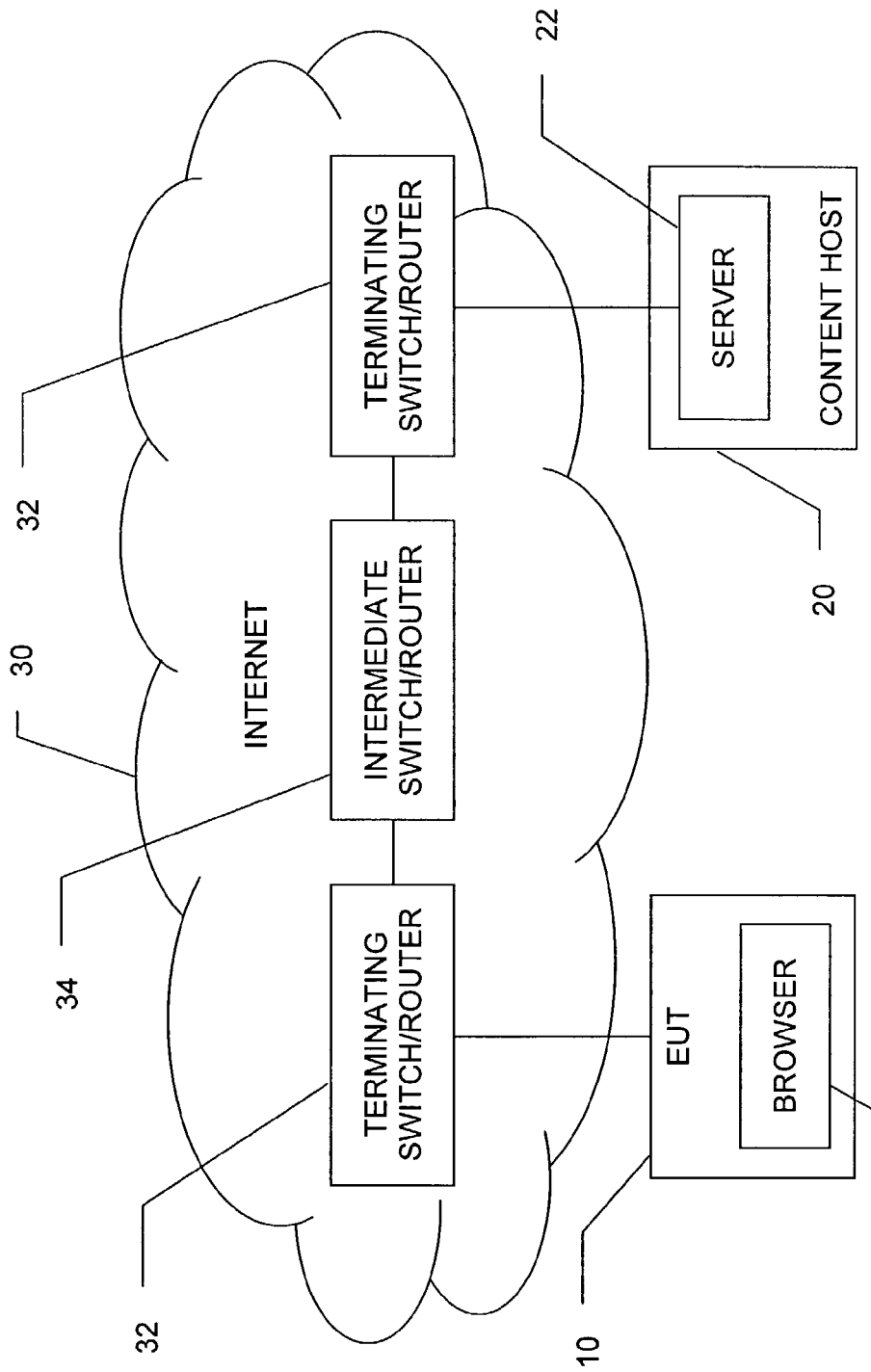
FIG. 1 is a block diagram showing an exemplary communications network suitable for practicing aspects of the present invention.

With reference to FIG. 1, an EUT 10 running a suitable client or application thereon, such as, a web browser 12, obtains content from a content provider or host 20 over the Internet 30, e.g., via the host's web server 22. As shown, the EUT 10 and server 22 are connected to the Internet 30 via respective terminating switches and/or routers 32 that are operatively connected to one another via an intermediate switch or router 34.

Aspects of the present invention are described herein with reference to content or web pages obtained by the EUT 10 from the server 22, so for clarity and simplicity, only these terminals and their supporting network elements are shown. However, it is to be appreciated that suitably a plurality of such terminals and/or supporting network elements are similarly equipped and/or situated in the usual manner so as to likewise take advantage of aspects of the present invention in connection with Internet content being exchanged between any combination of EUTs and servers. Also, for exemplary purposes herein, the EUT 10 and server 22 are shown as wire-line based. However, it is to be appreciated that optionally either may be a wireless or wire-line based device. Further, while described with reference to a client-server relationship, the same approach may similarly be implemented in a peer-to-peer communications environment or scenario.

Figure 2:
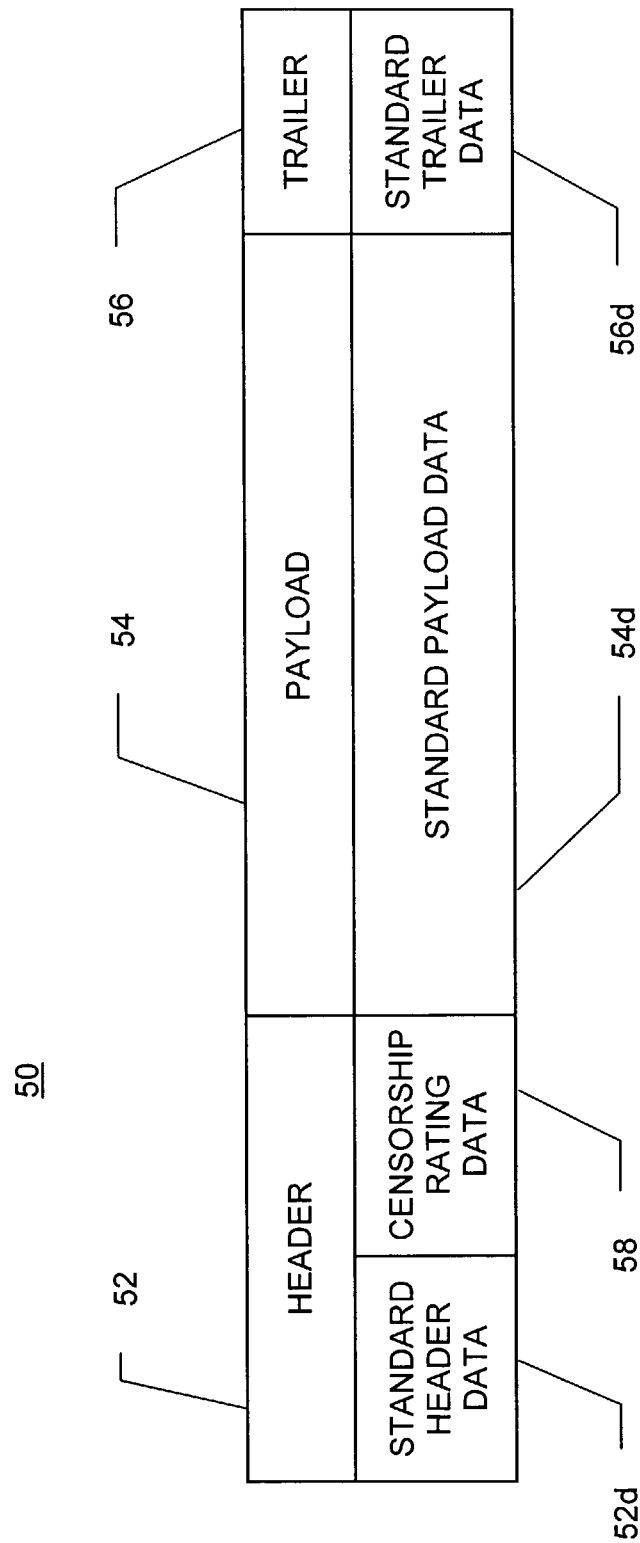
FIG. 2 is a block diagram showing an exemplary data packet format suitable for practicing aspects of the present invention.

With reference to FIG. 2, Internet content or web pages are conveyed from the server 22 to the EUT 10 over the Internet as data packets, e.g., such as, a data packet 50 formatted or framed to include a plurality of fields, e.g., a header 52, a payload 54 and a trailer 56. Suitably, the payload data 54d and trailer data 56d contained in the payload field 54 and the trailer field 56, respectively, remain unaltered from what they would conventionally be. However, the header 52, in addition to conventional data 52d, also includes censor rating (CR) data 58. The CR data 58 is assigned by the content host 20 so as to identify the content or the web page represented by or associated with the data packet 50 being sent. Suitably, insertion of the CR data 58 into the data packet 50 is accomplished or executed at any open system interconnection (OSI) layer, of the well known seven layer OSI reference model, above the physical layer.

Suitably, the CR data 58 includes a flag or index or other determined identifier which is recognizable by the browser 12 running on the EUT 10. The CR data 58 in this manner indicates the type of content being conveyed to the EUT 10. For example, the CR data 58 may be the same as or similar to the well known movie or film ratings (i.e., G, PG, PG-13, R, NC-17, X, XXX) or television ratings (i.e., TV-Y, TV-Y7, TV-G, TV-PG, TV-14, TV-MA) or a like rating system that categorizes and identifies various types of Internet content by theme and/or appropriate audience age level and/or other suitable criteria. Optionally, the CR data 58 specifically identifies the type of Internet content contained in or associated with the data packet 50, e.g., the CR data 58 may indicate that the content includes explicit sexual material, violence, strong language, or other identifiable subject matter as the case may be.

Accordingly, desired censorship of Internet content is carried out at the EUT 10 by discarding or otherwise blocking reception of data packets 50 that are recognized, e.g., by the browser 12, as having prohibited CR data 58. Optionally, the designation of prohibited CR data 58 is selectively programmable or set by the EUT owner or operator. For example, a parent may opt to prohibit certain content deemed inappropriate for their children and so set given parameters or program the browser 12 to not accept any data packets 50 containing in their header 52 any CR data 58 identifying that content deemed inappropriate for their children. Suitably, such programming is arranged so as to only allow changes thereto upon entry of a selected password or passage of other security measures, e.g., so that children cannot override or thwart parental controls put is place. Optionally, of course, the browser 12 may also be arranged so as to not accept data packets 50 having no CR data 58 in their header 52. In this manner, un-rated content is blocked.

To better understand the operation, capabilities and/or different aspects of various embodiments of the present invention, consider the following exemplary scenario.

Figure 3:
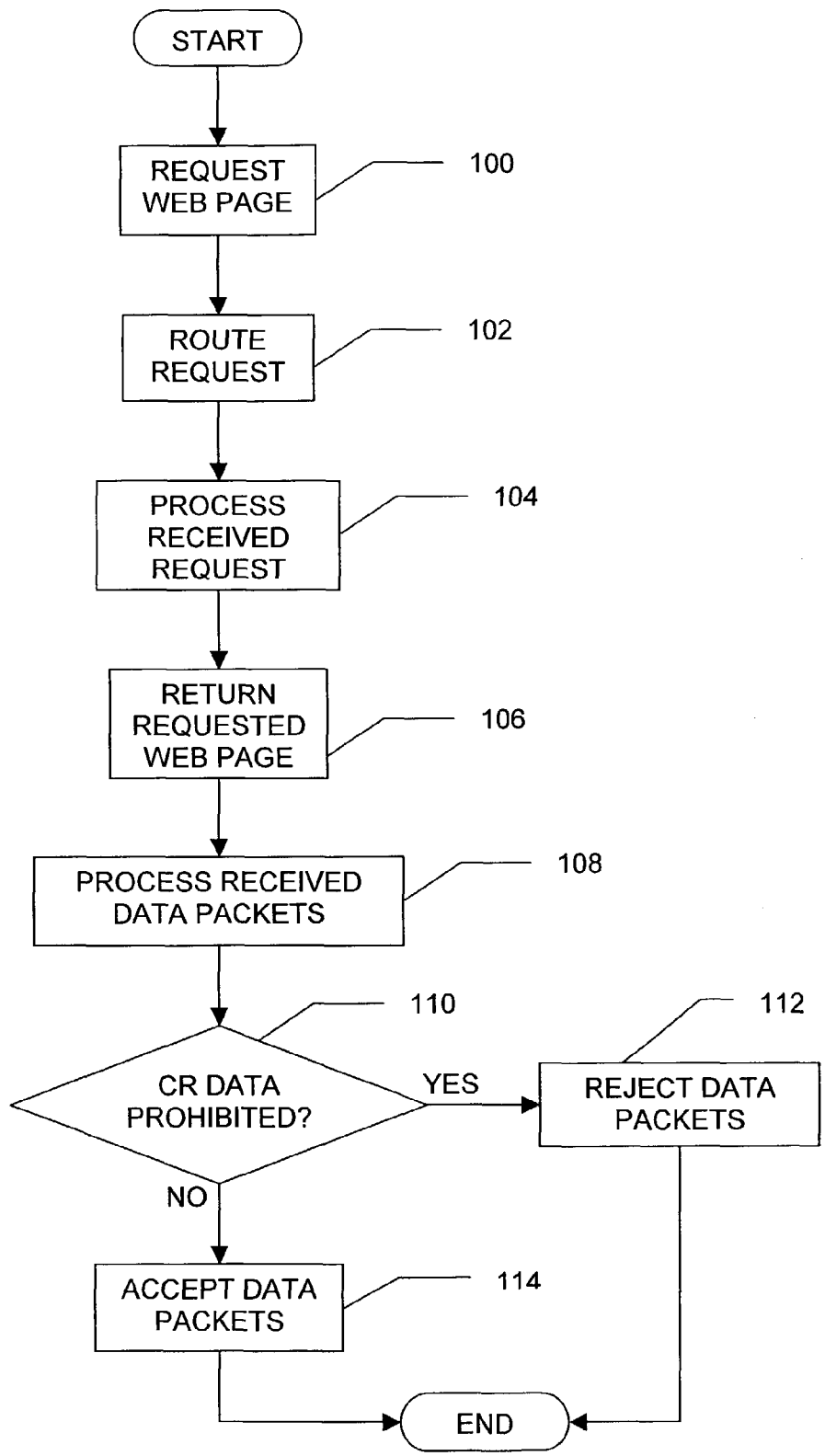
FIG. 3 is a flow chart showing an exemplary method for practicing aspects of the present invention in connection with a web page received by an EUT from a web server.

With reference to FIG. 3, at step 100, the browser 12 residing on the EUT 10 sends a request to the host 20, e.g., in hypertext transport protocol (HTTP), secure HTTP (SHTTP) or a like format, to download a web page from the server 22. At step 102, the request is routed to the server 22 over the Internet 30, i.e., from the EUT 10 to the first terminating switch/router 32, to the intermediate switch/router 34, to the second terminating switch/router 32, and finally to the server 22. At step 104, the server 22 processes the received request.

At step 106, the server 22 returns the requested web page as one or more data packets 50 having CR data 58 applicable to the web page inserted in the header 52. The data packets 50 are routed over the Internet 30 from the server 22 to the first terminating switch/router 32, to the intermediate switch/router 34, to the second terminating switch/router 32, and finally to the EUT 10 where they processed at step 108.

At decision step 110, it is determined if the CR data 58 in the received data packets 50 is prohibited. If the CR data 58 is prohibited, then the process branches to step 112 where the sent data packets 50 are discarded, blocked and/or ignored. Otherwise, if the CR data 58 is not prohibited, then the process continues to step 114 where the received data packets 50 are processed and the requested web page displayed by the browser 12.

Suitably, if step 112 is reached, i.e., if data packets 50 are rejected due to identification of prohibited CR data 58, the browser 12 displays an appropriate message or symbol indicative of the same, e.g., optionally indicating that data packets 50 had been rejected for non-compliance with CR data restrictions and optionally what the CR data 58 was that resulted in their censorship. Likewise, if step 114 is reached, i.e., if the data packets 50 for the requested page are accepted, the browser 12 is also arranged to display a message or symbol that is indicative of the CR data 58 contained in the header 52 of the accepted data packets 50. In this manner, the user is informed of the CR data 58 assigned to the web page viewed on the browser 12.

In an alternate embodiment, appropriate censorship is carried out at one or more of the terminating switches/routers 32 or the intermediate switch/router 34. That is to say, the switches/routers 32, 34 through which the data packets 50 are conveyed are optionally equipped to recognize the CR data 58 and respond according to determined criteria or instructions, e.g., as provided or set by the EUT owner. For example, an Internet service provider (ISP) that provides Internet service to the EUT owner may selectively block or otherwise not deliver data packets 50 recognized as having CR data 58 in their headers 52 that the EUT owner has instructed the ISP to prohibit. In addition to providing the selected censorship, the switches/routers 32, 34 may also be equipped to return a notification to the server 22 upon encountering a data packet 50 lacking CR data 58 thereby informing the host 20 of their oversight in this respect.

Optionally, to further encourage hosts to properly employ the CR data 58, ISPs may choose not to forward any data packets 50 that do not contain CR data 58 in their header 52 and or block host's that consistently misidentify the content they are providing. Likewise, EUT owners can similarly respond by refusing all data packets 50 that do not contain CR data 58 in their header 52 and/or block data packets 50 from specifically identified hosts and/or server addresses that are known to misidentify content.

It is to be appreciated that FIG. 3 as shown relates to a web page that is being requested by the EUT 10. However, the process is equally applicable to so called "pop-ups" by merely omitting those aspect related to the EUT 10 requesting the web page. That is to say, the pop-up web page is merely sent to the EUT 10 without a specific request therefrom for that web page. Nevertheless, the pop-up web page is similarly censored in a like manner, i.e., via CR data 58.

It is also to be appreciated that particular elements or components described herein may have their functionality suitably implemented via hardware, software, firmware or a combination thereof. Note also that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively mixed and matched as appropriate to achieve other alternate embodiments suited for desired applications, the other alternate embodiments thereby realizing the respective advantages of the aspects incorporated therein. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the invention has been described with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of censoring Internet content, said method comprising:
    packetizing a web page into one or more data packets, each data packet comprising a header, a payload, and a trailer;
    using a computer processor, inserting a censorship rating relating to the web page in the header of each data packet;
    conveying the data packets over the Internet to a receiving end user terminal;
    determining the censorship ratings in the headers of the data packets; and,
    acting on the data packets in response to their determined censorship ratings.

2. The method of claim 1, wherein the step of acting comprises:
    accepting the data packets if the determined censorship ratings meets defined criteria; and,
    rejecting the data packets if the determined censorship ratings do not meet the defined criteria.

3. The method of claim 1, further comprising:
    reading the headers to determine the censorship rating of the data packets.

4. The method of claim 1, wherein the censorship ratings indicate at least one of a subject matter for the web page and an audience age limit for the web page.

5. A method of censoring content provided by a host over a communications network to an end user terminal, said method comprising:
    formatting the content into data packets;
    provisioning each data packet with a header, a payload, and a trailer;
    using a computer, providing for a censorship rating to be contained in the header of each data packet, said censorship rating relating to the content;
    conveying the data packets over the communications network;
    reading the censorship ratings in the headers of the data packets; and
    delivering data packets having censorships ratings that are within defined limits to the end user terminal.

6. The method of claim 5, further comprising:
    blocking delivery of data packets to the end user terminal when it is determined that the data packets do not have censorship ratings in their headers.

7. The method of claim 5, further comprising:
    informing the host when headers are read that do not contain censorship ratings.

8. The method of claim 5, further comprising:
    informing the end user terminal when data packets are not delivered thereto because it is determined that they have censorship ratings that are outside the defined limits.

9. The method of claim 5, wherein the defined limits are selected by an operator of the end user terminal.

10. The method of claim 5, wherein the censorship ratings categorize content by at least one of a content's subject matter and an audience age limit for the content.

11. A system for censoring content provided by a host over a communications network to an end user terminal, said system comprising:
    means for formatting the content into data packets;
    means for provisioning each data packet with a header, a payload, and a trailer;
    means for inserting censorship ratings in the header of each data packet, said censorship ratings relating to the content;
    means for reading the censorship ratings of the data packets in the headers; and
    means for delivering data packets having censorships ratings that are within defined limits to the end user terminal.

12. The system of claim 11, further comprising:
    means for blocking delivery of data packets to the end user terminal when it is determined that the data packets do not have censorship ratings in their headers.

13. The system of claim 11, further comprising:
    means for informing the host when headers are read that do not contain censorship ratings.

14. The system of claim 11, further comprising:
    means for informing the end user terminal when data packets are not delivered thereto because it is determined that they have censorship ratings that are outside the defined limits.

15. The system of claim 11, further comprising:
    means for selection of the defined limits by an operator of the end user terminal.

16. The method of claim 5, further comprising:
    blocking delivery of the data packets to the end user terminal when the data packets have censorship ratings outside the defined limits; and
    informing the end user terminal when delivery of data packets is blocked.

17. The method of claim 5, wherein a switch/router associated with the communications network reads the censorship ratings of the data packets and selectively delivers the data packets to the end user terminal.

18. The method of claim 5, wherein an Internet service provider associated with an owner of the end user terminal reads the censorship ratings of the data packets and selectively delivers the data packets to the end user terminal.

19. The system of claim 11, further comprising:
    means for blocking delivery of the data packets to the end user terminal when the data packets have censorship ratings outside the defined limits.

20. The system of claim 11, further comprising:
a switch/router for reading the censorship ratings of the data packets and delivering data packets having censorships ratings within the defined limits to the end user terminal.

* * * * *